April 10, 1956 M. B. LUKE 2,741,692
ELECTRICALLY HEATED PROTECTIVE COVERING FOR AN
AIRFOIL AND METHOD OF MAKING THE COVERING
Filed Nov. 26, 1952 4 Sheets-Sheet 1

United States Patent Office 2,741,692
Patented Apr. 10, 1956

2,741,692

ELECTRICALLY HEATED PROTECTIVE COVERING FOR AN AIRFOIL AND METHOD OF MAKING THE COVERING

Marvin B. Luke, Los Angeles, Calif., assignor to The B. F. Goodrich Company, New York, N. Y., a corporation of New York Application November 26, 1952, Serial No. 322,666

16 Claims. (Cl. 219—46)

The invention relates to electrically heated protective coverings and methods of making the same, including heating structures therefor, and especially to such protective coverings having individually assembled resistance heating structures side-by-side therein for preventing the accumulation of ice on airfoils and other surfaces in air under icing conditions.

Heretofore, electrically heated protective coverings or shoes for mounting on the leading edges of wings, empennage elements and other airfoil surfaces have generally had resistance heating wires extending longitudinally and continuously between opposite, widely spaced-apart marginal portions of the shoe, and the breakage or fracture of one or more of the heating wires, as from the impact of stones, for example, on the shoe has resulted in objectionable loss of heating throughout a substantial area of the shoe. This generally rendered the shoe useless for ice-removal purposes even though it was still serviceable from the standpoint of abrasion and other deterioration.

Prior shoes having chordwise heating wires arranged in series connected groups of wires individually in parallel and electrically connected to spanwise flexible conductors located in the plane of the wires in uninsulated relation to the wires to provide spanwise heating zones side-by-side in the shoe, have presented the problem of avoiding gaps in the heating along and between adjacent margins of adjacent heating zones. An object of the invention is to overcome the foregoing disadvantages and difficulties of the prior shoe constructions for aircraft components.

Other objects of the invention are to provide for an improved construction of electrically heated protective coverings including electrical heating structures therefor having increased life expectancy and for an improved method of making the coverings including electrical heating structures therefor; to provide for effective ice-removal temperatures at the exposed outer surface of adjacent heating zones of a protective covering suitable especially for the wings and empennage of an aircraft; to provide for continuity and uniformity of heating from one margin or edge to an opposite margin or edge of each heating zone of a protective covering; to provide for uniform or different temperatures at adjacent heating zones, or for uniform or different temperatures per unit of area along a zone, especially a tapered zone, of the covering; to provide for eliminating gaps in electrical heating across the marginal junctions of adjacent heating zones of the covering, especially a covering of tapered shape in plan; to provide for regular or straight-line margins of adjacent heating zones; and to provide for simplicity, light-weight, thinness, flexibility and smoothness of construction, convenience of manufacture, and for effectiveness of operation.

Still other objects of the invention are to provide for effecting ice-removal temperatures despite the fracture or breakage of one or a plurality of resistance heating elements or wires within a heating structure as by the impact of stones and the like thereon; to provide for electrically insulating all the current-carrying elements one from the other of a flexible heating structure together with electrically insulating adjacent flexible heating structures one from the other; to provide for convenience and accuracy of assembly of elements of the heating structure; to provide for an improved method of making an individual flexible heating structure or unit of rectangular or tapered shape for the covering; to provide for independently assembling each individual heating unit and for independently mounting the same in the covering; to provide effectively for extensive flexibility of the heating structure; to provide for continuity of heating from one marginal edge of the heating structure to the other marginal edge thereof; to provide for electrically connecting a plurality of chordwise resistance heating elements or wires of the heating structure in parallel and a series of the pluralities of resistance heating elements in series arrangement spanwise; to provide for permanently connecting, electrically and mechanically, one section of a heating structure to another section of the heating structure in series or end to end relation; and to provide for effectively electrically insulating flexible conductors or connectors from adjacent portions of heating elements in overlapping spaced relation to such conductors of a heating structure while maintaining an effective electrical connection of the conductors with the heating elements.

These and other objects and advantages of the invention will be apparent from the following description.

In the accompanying drawings which form a part of this specification.

Figures 1, 2, 3, 4, 5:
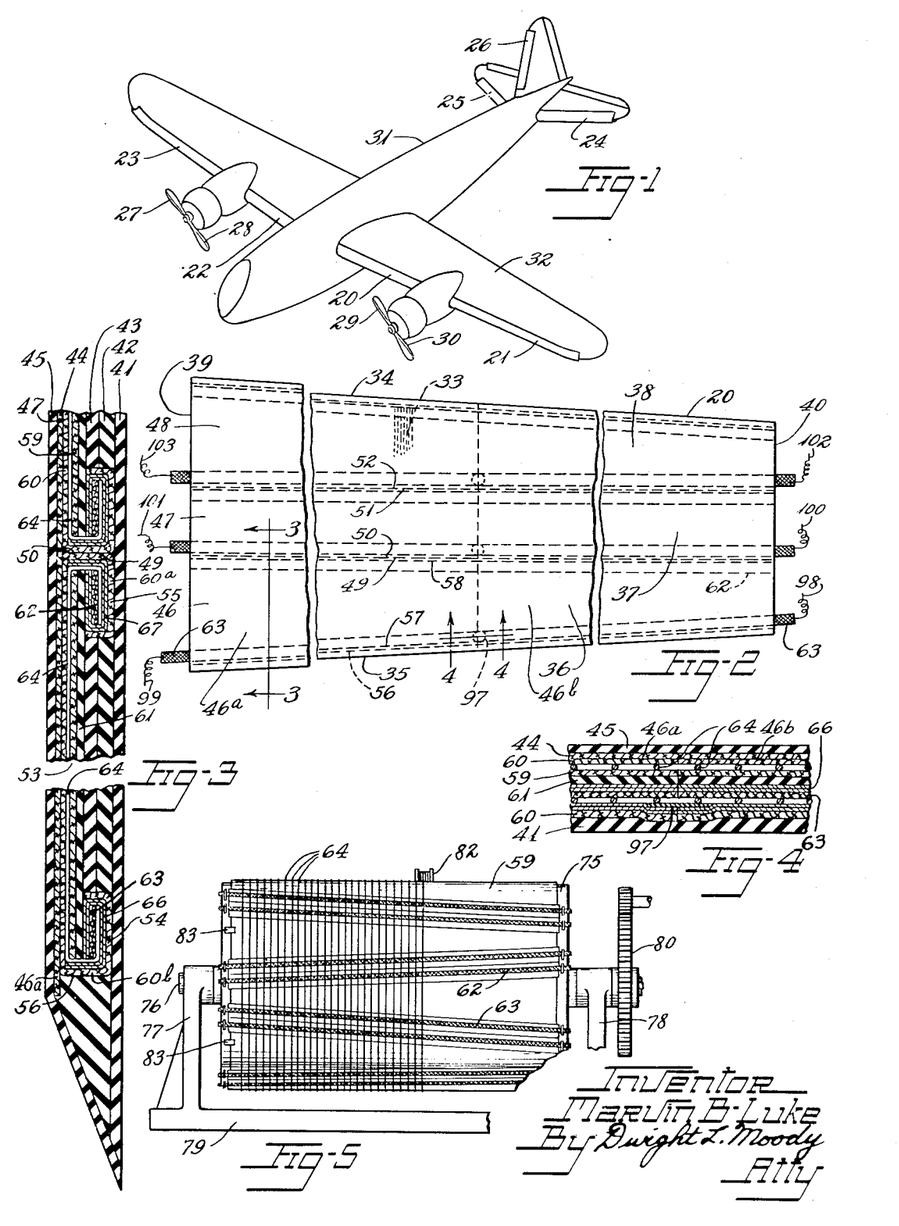
Fig. 1 is a perspective view of electrically heated protective coverings on the leading edges of airfoils of an airplane and constructed in accordance with and embodying the invention.
Fig. 2 is a plan view from above of one of the protective coverings in its flat "as molded" condition and of tapered form for mounting conformingly about the leading edge of a wing, for example, of the airplane, parts being broken away.
Fig. 3 is a sectional view in an enlarged scale taken along line 3—3 of Fig. 2, parts being broken away.
Fig. 4 is a sectional view in an enlarged scale taken along line 4—4 of Fig. 2 and showing a permanent electrical connection between adjacent sections of a heating structure of the covering, parts being broken away.
Fig. 5 is a front elevational view of apparatus for forming a plurality of foundational units used for making heating structures of the invention.

Electrically heated apparatus or protective covering or shoes 20 to 30, inclusive, each embodying the invention, are mounted on and conformed to the leading edges of airfoils such as wings, empennage, propeller blades and other surfaces of an aircraft 31, as shown especially in Fig. 1, for preventing the accumulation of ice on the leading edges in air under ice-forming conditions. The coverings may be adhesively attached to the leading edges as by a suitable liquid rubber cement of the air-curing type, and are electrically connected in any desired manner to suitable control means and a source of electrical heating current (not shown) carried by the aircraft 31. The construction and arrangement of all the coverings are the same except as to plan form, if desired; consequently only the tapered protective covering 20 extending along an inboard portion of the leading edge of a wing 32 will be described in detail.

The electrically heated apparatus or protective covering 20, shown in Fig. 2 was viewed from above in a flat "as molded" condition and before attachment to the leading edge of the wing 32, is desirably of tapered shape in plan to accommodate varying thickness of the wing 32 at its leading edge region and is constructed of flexible dielectric material. The dielectric material may be natural or synthetic rubber, or rubber-like material or synthetic material having substantially similar chemical composition or physical properties to natural rubber and to equivalents therefor. Such dielectric material or compositions are included within the meaning of the term "rubber-like material" used hereinafter in the specification.

The thin sheet-like covering or shoe 20 has electrical heating means or a resistance heating grid 33 located intermediate its thickness and between opposite margins 34, 35 of the covering and constituting a unitary part thereof. The arrangement provides at least one and preferably a plurality of heating zones 36, 37, 38 extending in a direction along a margin, preferably a spanwise margin 34, 35, of the covering with the heating zones in side-by-side adjoining relation one to the other from substantially one end or chord-wise margin 39 to substantially the other end or chordwise margin 40 of the covering.

For the particular arrangement shown in Fig. 2 having the elongated tapered form, the frontal heating zone 37 is rectangular with uniformity of heating per unit of area spanwise and chordwise of the covering, while each rearward heating zone 36, 38 is trapezoidal or tapered in form spanwise with relatively greater width at its one end 39 or inboard end as compared to that of the frontal heating zone and having desirably uniformity of heating per unit of area spanwise and chordwise of the covering, the heating dissipation per unit of area at the frontal heating zone being relatively greater than that at each rearward heating zone as for anti-icing or ice-burning purposes to maintain a central gap in the ice-deposit. Other arrangements may be provided for airfoils or other structures of aircraft not requiring the tapered covering and tapered heating zone construction. For example, the covering may be rectangular, if desired, with all heating zones having a rectangular shape and uniform width and having the same uniform heating per unit of area chordwise and spanwise, relative to one another, or only the rearward heating zones may have the same uniform width and the same uniform heating per unit of area relative to one another. If desired, all tapered heating zones may have gradually decreasing heating per unit of area from the wider or inboard end to the narrower or outboard end of each zone.

The covering comprises an integral inner insulating layer formed or built-up of a continuous base sheet 41 and filler sheets 42, 43 of suitable thin rubber-like material and desirably of rubbery polychloroprene material or composition known as Neoprene which is advantageous especially because of its resistance to deterioration from heat and aging and its elasticity. Upon the inner layer of bonded-together sheets 41, 42, 43 the resistance heating grid 33 as a whole is securely mounted. A continuous, thin, reinforcing ply 44 is made of suitable textile fabric sheet material such, for example, as woven or knitted textile fabric of filamentary material of cotton, nylon, rayon, silk, glass fibers or other suitable fibrous material, and may be coated on both sides with suitable rubber-like material, preferably rubbery polychloroprene. The reinforcing ply 44 is mounted on the resistance heating grid 33 and is cemented in place with a suitable liquid neoprene cement. The reinforcing ply 44, preferably of woven glass fabric, is covered by a continuous, thin outer layer 45 of suitable rubber-like sheet material, preferably rubbery polychloroprene, which is suitably cemented in place upon the ply 44 to provide an aerodynamically smooth, protective, elastic, outer or weather-exposed surface of the covering 20 highly resistant to abrasion, puncture, aging, oils and gasoline, heat, weather, ozone and sunlight.

The electrical heating means 33 as a whole includes a plurality of individual electrical heating structures 46, 47, 48 in insulated relation one to the other in the heating zones 36, 37, 38. Each heating structure, for example, the tapered heating structure 46, may be of sectional construction, and occupies the entire chordwise width of a heating zone, for example, tapered zone 36, and extends continuously spanwise along the zone with adjacent margins 49, 50, and 51, 52, respectively, of adjacent heating structures 46, 47 and 47, 48, respectively, in adjoining or abutting and electrically insulated relation one to the other but with the dielectric material at the juncture of the adjacent margins 49, 50 and 51, 52 heated by conduction.

This makes feasible effecting continuity of heating chordwise across all the heating structures 46, 47, 48 and across adjoining margins 49, 50 and 51, 52 thereof, so as to avoid gaps, even narrow gaps, in the chordwise heating especially at the margins 49 to 52. Thus, the invention eliminates aerodynamically objectionable narrow spanwise bands of residual ice remaining on the exposed surface of the outer layer 45 of the covering along and between the adjacent margins of adjacent heating structures, which residual ice produces turbulent flow of air across the wing.

The construction and arrangement of the individual heating structures 46, 47, 48 are the same, except as to chordwise width and except as to the rectangular central heating structure 47 having substantially parallel margins 50, 51, while each of the tapered rearward heating structures 46, 48 has spanwise margins converging toward one another in the direction away from the inboard end 39 toward the other or outboard end 40 of the covering. This facilitates the tapered shape of the covering. In view of such similarity, only the construction and arrangement of the tapered heating structure 46 will be described in detail.

The electrical heating structure 46 is shown especially in Figs. 2, 3, 4 and 17, comprises a thin sheet-like body 53 of suitable elastic dielectric rubber-like material with electrical insulating and heat-resisting characteristics, and having chordwise spaced-apart closed fold portions 54, 55 of such material extending spanwise and converging toward one another at spaced-apart margins 49, 56 so as to provide spanwise-extending elongated conductor passages or conduits 57, 58 in the margins 49, 56 having continuous peripheral walls of the dielectric rubber-like material. The body 53 intermediate the relatively thicker marginal fold portions 54, 55 may have a uniform thickness, for example, about 0.030".

The sheet-like body may be formed of a first reinforcing ply 59 and a relatively wider second reinforcing ply 60 in superimposed united relation one to the other. Each ply may be made of straight-laid, square-woven textile fabric of suitable filamentary material, preferably heat-resistant woven glass fabric, and may be coated on both sides with unvulcanized, dielectric, rubbery polychloroprene composition. A continuous, thin layer 61 desirably of rubbery polychloroprene sheet material is mounted for increased insulating purposes on the first ply 59 in overlying face-to-face cemented relation thereto and throughout the area thereof. The second ply 60 has its lateral marginal extensions or portions 60a, 60b beyond the edges of the first ply 59 and the rubbery layer 61 arranged in a laterally inward folded disposition in overlapping relation to the fabric ply 59 and the rubbery insulating layer 61 at a face of the body, as shown especially in Fig. 3. This provides the dielectric closed fold portions 54, 55 of the heating structure having the conductor passages or conduits 57, 58 in the spanwise margins 49, 56 thereof, the marginal portions 60a, 60b constituting in part the thin dielectric continuous peripheral walls of the passages.

Preferably, the electrical heating structure 46 has a plurality of flexible, stranded and braided wire conductors 62, 62 and 63, 63 of bronze, copper, copper alloy or other suitable conductive metal and in flat strip form mounted spaced-apart in succession and in insulated relation one to the other in each conductor passage 57, 58, and secured to and enclosed by the continuous peripheral wall of the passage. This facilitates extensive flexibility of the heating structure by virtue of the relatively short length of each conductor and the independent flexure of a conductor relative to the adjacent conductor in a passage.

For coacting with the conductors to heat the structure, the invention provides a plurality of solid or stranded, resistance heating elements or wires 64, 64 connected at their ends to the conductors 62, 63.

The resistance heating wires 64, 64 may be of nickel-chromium alloy or copper-nickel alloy or other suitable metal material and are sandwiched between the superimposed reinforcing fabric plies 59, 60. The wires 64, 64 extend chordwise or across the heating structure from substantially one edge or margin 49 to substantially the other edge or margin 56 with each wire in a transverse plane spaced from adjacent flat faces of the conductors 62, 63 to provide portions of the wires extending across the flat faces in spaced, overlapping, insulated relation to the conductors. The heating wires extend continuously chordwise in closely spaced-apart, substantially parallel, insulated relation one to the other between the spanwise margins 49, 56, and are disposed approximately perpendicular to the longitudinal centerline of the heating structure.

The heating wires 64, 64 continue from the margins in an inwardly folded manner interiorly about the inwardly folded marginal portion 60a, 60b so as to be beneath the outer surface thereof, and about the outer edges of the flat conductors 62, 63 in insulated spaced relation thereto to a position overlying the other flat faces of the conductors, and terminate at the inner edges of the conductors and such other flat faces thereof. The heating wires extend entirely across such other flat faces of the conductors in direct contact therewith and are soldered by fused metal at 65 to the conductors entirely across said other faces thereof to provide good low-loss electrical connection and secure mechanical connection of end portions of the heating wires to the flat conductors.

In the preferred construction and for increased insulating and marginal strength purposes, the heating structure has narrow, 2 ply, thin insulating tapes 66, 67 of suitable woven textile fabric coated on both sides with rubbery polychloroprene. The insulating tapes 66, 67 are wrapped once about the flat conductors and over the soldered, folded end portions of the heating wires and are disposed beneath the marginal fold portions 60a, 60b of the reinforcing ply 60 in a manner to completely enclose the conductors and the folded end portions of the heating wires so as to further insulate and protect the conductors and the heating wires, as shown especially in Fig. 3, and to coact for each purposes with the fabric plies 59 and 60 and the insulating rubber layer 61. This feature of the wrapped around insulating tapes 66, 67 is important to provide both mechanical and electrical strength at the conductor-containing passages of the heating structure and to assure fully enclosing the conductors and folded end portions of the wires in a walled pocket of insulating material.

The construction and arrangement of the heating structure 46 provides chordwise-extending resistance heating wires 64, 64 each desirably of the same cross-sectional area and located in a transverse plane close to the outer surface of the covering for effective heating purposes. The wires 64 are arranged in groups with the number of wires in each group such as to provide the desired substantially uniform heating per unit of area of the heating structure at each group, the individual wires of each group are connected in parallel electrically by the flexible conductors 62, 63, and the flexible conductors extend between and connect adjacent groups so as to place them in series electrically. The number of wires in each group is such that the individual wires thereof vary or differ only slightly in length and resistance relative to one another despite the convergence of the conductors. The number of wires in each group may be the same for all groups for substantially uniform and equal temperatures per unit of area of all groups, or may vary from group to group, if desired, while providing for substantially uniform temperatures per unit of area of each group. In the preferred construction each group spanwise has the same number of individual wires, for example, 8 wires to provide for substantially equal and uniform heating per unit of area throughout the heating structure even though it is tapered. It will be noted that the invention makes feasible the provision of graduated temperatures in the heating zones of the covering, chordwise, or spanwise, or both, although the heat dissipation per unit of area of a group of wires is substantially uniform throughout the group.

A further advantage of the heating structure 46 even though of tapered construction, is that normally the heating wires 64 are individually of relatively short length and each extends only a short chordwise distance across the covering as a whole when a plurality of spanwise heating zones are provided in the covering, so that fracture or breakage of a wire or wires in a group as by impact of stones and the like, effects the heating of only a very small, highly localized area of the covering. This results from having the heating current, which would normally have passed through the broken wires, pass through the remaining wires of the group and through the conductors 62, 63 to the adjacent group where such current is distributed to and passes through all the wires of the adjacent group. However, the remaining wires in the group with a broken wire or wires therein, will have slightly increased temperature rise as compared to that at the adjacent group because of the increased heating current passing through said remaining wires, but this increased temperature rise is highly localized and limited to the particular group, and does not materially affect the remainder of the resistance heating grids 62, 63, 64 of the electrical heating structure 46. The arrangement makes feasible these new results without requiring the use of supplementary wires across the wires of a group and disposed between the spaced-apart conductors for the group.

When the covering is of considerable length, the electrical heating structure 46 may be made of two or more independent sections 46a, 46b each of like construction except as to chordwise width and, if desired, spanwise length, for convenience of manufacturing purposes. The adjacent mating ends of the sections 46a, 46b are suitably spliced together as shown especially in Fig. 4, and the adjacent ends of adjacent conductors 63, 63, for example, in a marginal passage of the sections 46a, 46b are abutted and soldered by fused metal to one another and to an underlying, thin copper or other conductive metal disc 97 in the manner shown in the drawings. However, the adjacent slightly spaced ends of the other conductors 62, 62 in the other marginal passage of the sections 46a, 46b are electrically and mechanically insulated from one another by an intervening spacer or filler 96 of suitable rubber-like material. This produces the unitary, individual heating structure 46 in its entirety and the opposite end conductors 63, 63, for example, in one margin 56 of the section 46 may be connected to suitable wire leads 98, 99 for connection to the source of electrical heating current.

The other electrical heating structures 47 and 48 may be made in two sections united by splicing like the structure 46 and may be electrically connected to the source of heating current in like manner by wire leads 100, 101 and 102, 103. The particular form of covering shown in the drawings has the relatively wider and tapered heating structures 46, 48 spaced-apart chordwise for disposition at the rearward areas of the leading edge, and has the relatively narrow and rectangular intermediate or frontal heating structure 47 for disposition at the frontal or immediate leading edge region of the airfoil or wing 32. The intermediate or central or frontal heating structure 47 is desirably heated continuously to provide relatively higher temperatures or heat-dissipation for anti-icing heating at the outer surface of the frontal or central heating zone 37 of the covering, where the ice tends to form first and deposit the thickest, and such continuous heating by the structure 47 maintains a substantial gap in the chordwise continuity of the ice-deposit. Relatively lower temperatures or heat-dissipation may be employed at the desirably cyclically heated rearward heating zones 36, 38 to melt the overlying ice-deposit only at its inner surface of the covering to break the adhesive bond therebetween and at the same time produce only a very thin water film between the covering and the overlying ice, whereby the rearward sweep of the airflow effectively removes the remaining rearward ice without permitting the formation of objectionable ice-deposits on the more rearward unprotected areas of the wing resulting from the re-freeezing of flow-back water from melted ice. The flow-back water from the central or frontal heating zone 37 is normally caught and re-frozen on the ice-deposit at the cyclically heating rearward heating zones 36, 38 of the covering.

The fabric and rubber-like parts of the covering 20 including the individual heating structures 46, 47, 48 are desirably united integrally as by vulcanization under heat and pressure. This produces the desired unitary integral covering adapted for flexure and conformance about and along the leading edge of the airfoil.

Figure 6:
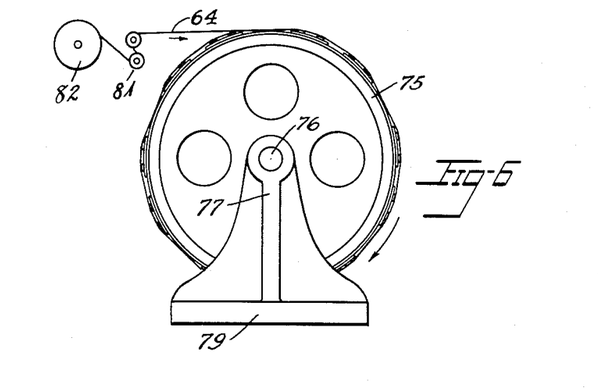
Fig. 6 is an end elevational view of the apparatus shown in Fig. 5.

For making an individual electrical heating structure 46, for example, or a section 46a, 46b thereof in accordance with the method steps of the invention, there is provided an elongate cylindrical drum 75 mounted on a shaft 76 journaled in vertical supports 77, 78 of a frame 79. The rotatable drum 75 is power driven by suitable gear mechanism 80 and electrical power means (not shown), which power means may be used to drive a suitable spool-carrying and advancing means (not shown) to advance a spool 82 having suitable resistance heating wire 64 wound thereon, along the drum at a uniform rate, the spool 82 being located at the top of the drum and spaced radially to a side thereof, as shown in Figs. 5 and 6, tension mechanism 81 being provided to effect a tensioned conditioned of the wire 64 as it is wound on the drum 75.

The method of making the tapered individual heating structure 46 or section 46a thereof includes the steps of forming a reinforcing first ply 59 in a cylindrical shape upon the cylindrical supporting surface of the drum 75, and this is accomplished by wrapping once around the drum 75 a sheet of straight-laid, square-woven glass fabric coated on both sides with unvulcanized rubbery polychloroprene composition and forming a lap joint on the ends of the sheet using suitable liquid Neoprene cement to hold the joint. Small removable tabs 83, 83 of plastic adhesive tape are utilized to hold the cylindrical reinforcing first play 59 against shifting axially and circumferentially relative to the drum as shown especially in Fig. 7. Then a plurality of pairs of narrow bands 84, 84 and 85, 85 of non-adhesive thin woven textile fabric impregnated with starch and known as Holland cloth, are placed on the reinforcing first ply 59 in circumferentially spaced-apart relation with each pair of strips extending in side-by-side abutting relation longitudinally or axially along the cylindrical ply 59 in inclined relation, as shown, or, if desired, in parallel relation to the longitudinal axis thereof, the inclined relationship being used for a tapered construction and the parallel relationship being used for a rectangular construction of the heating structure. The tackiness of the rubber-like coating on the first ply is sufficient to retain the bands in place.

Figure 7:
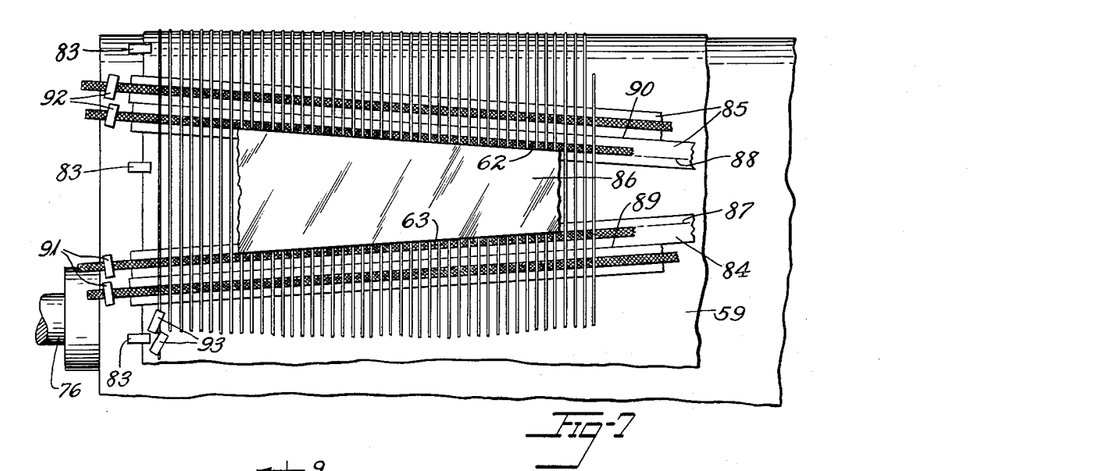
Fig. 7 is a view like Fig. 5, but in an enlarged scale, and showing a template locating spaced-apart conductors in an initial step of making a foundational unit of a heating structure, parts being broken away and in section.
Figure 8:
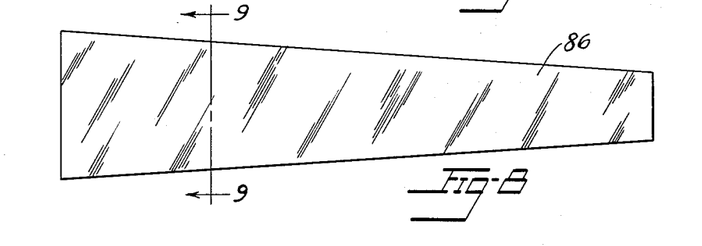
Fig. 8 is a plan view of the template.
Figure 9:
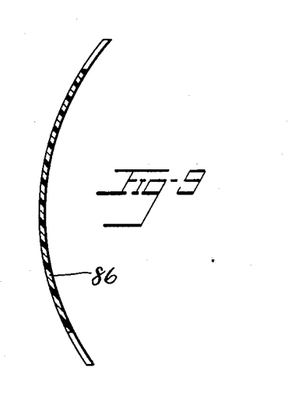
Fig. 9 is a sectional view of the template taken along line 9—9 of Fig. 8.

The circumferential spacing and longitudinal disposition of the bands of Holland cloth are established by using a template 86 of suitable transparent, relatively stiff plastic material having approximately the desired shape of the heating structure, for example, a tapered shape, and conforming substantially to the curvature of the drum, as shown especially in Figs. 7, 9 and 8. The tapered template 86 is also used for making longitudinally-extending straight pencil lines 87, 88 on the bands of Holland cloth, which pencil lines serve as indicia of the position of each flexible conductor 62, 63.

It will be noted that for the tapered construction of the heating structure the wide end of the tapered template is placed at one end of the cylindrical ply 59 for outlining one heating structure, and then the wide end of the template is placed at the opposite end of the ply to outline the next adjacent heating structure as shown in Fig. 5. This provides complementary tapered areas in the first ply 59 and is advantageous to avoid waste material and to make a plurality of tapered heating structures on the cylindrical drum. A longitudinally-extending, continuous, stranded and braided wire conductor 62, 63 in flat strip form is next placed face down on each of the Holland cloth bands 84, 85 with the inner margin of the conductor 62, 63 at and conforming to the longitudinal straight pencil line 87, 88 on the underlying band. The conductors 62, 63 makes feasible the provision of the successive relatively short conductors 62, 62 and 63, 63 in the passages or hollow margins of the heating structure 46 by virtue of severing the continuous conductors in a manner to be described more fully hereinafter. Each continuous conductor 62, 63 is desirably held taut along the inclined straight pencil line by means of suitable tabs 91, 92 at each end of the drum, as shown especially in Fig. 7.

A continuous resistance heating wire 64 having one end thereof secured to the drum by suitable tabs 93, 93 is drawn off the spool 82 and wound helically about and along the cylindrical first reinforcing ply 59 and across all the Holland cloth bands 84, 84 and 85, 85 and all the continuous conductors 62, 63 in superimposed relation thereto with adjacent convolutions of the heating wire 64 in closely adjacent, spaced-apart relation one to the other and in slightly inclined relation to a plane normal to and intersecting the longitudinal axis of the drum 75. The heating wire 64 is maintained under tension while being wound, and its tensioned condition together with the tackiness of the rubber-like surface of the first ply 59 functions to partially imbed the wire in the rubber-like material and also to retain the wire as wound in the desired helical path. After the desired number of convolutions have been wound about the drum, the wire is cut loose from the spool 82 and the cut-end secured by a suitable tab to the drum at the other end thereof.

The tapered template 86 is then placed on the assembled material on the drum 75 between a pair of spaced-apart continuous conductors 62, 63 as shown especially in Fig. 7, and the conductors are adjusted to be oppositely inclined relative to the longitudinal axis of the cylindrical first ply 59 and to conform to the longitudinal edges of the tapered template so as to establish the exact tapered and spaced-apart relationship of the conductors and their disposition adjacent the longitudinal margins of the tapered area of the first ply 59. All the convolutions of the heating wires 64 are then soldered at 65 to and entirely across the exposed upper face of each of the conductors to provide good low-loss electrical connection and a secure mechanical attachment of the convolutions to the conductors. It is to be noted that the Holland cloth bands 84, 84 and 85, 85 insulate the underlying rubber-like material against damage from the heat of the soldering operation and restrain the flow of soldering flux onto the adjacent unprotected rubber-like material where such soldering flux is objectionable because it prevents good bonding and vulcanization.

Figures 10, 11, 12, 13, 14:
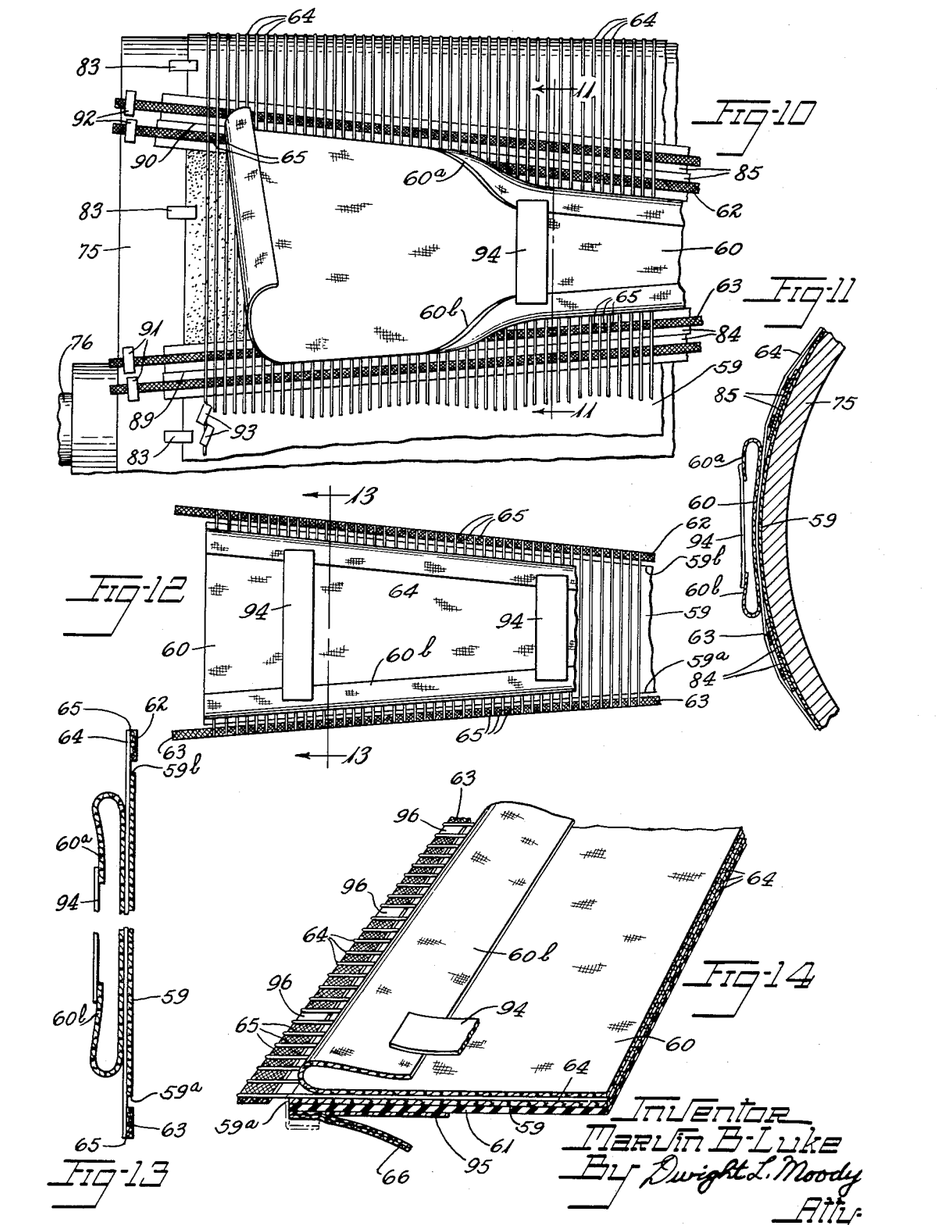
Fig. 10 is a view like Fig. 5, but in an enlarged scale, and showing an intermediate step of making the foundational unit, with one portion of the drawing indicating the next step in the method of making a heating structure, parts being broken away.
Fig. 11 is a sectional view taken along line 11—11 of Fig. 10, parts being broken away.
Fig. 12 is a plan view from above of the foundational unit in its last step of manufacture and in flat form after its removal from the apparatus, parts being broken away.
Fig. 13 is a sectional view taken along line 13—13 of Fig. 12, parts being broken away.
Fig. 14 is a sectional and perspective view in an enlarged scale taken laterally of a heating structure showing the next step of its manufacture using the completed foundational unit shown in Figs. 12 and 13, parts being broken away.

After completion of the soldering, the soldering flux on the Holland cloth bands and in the space between the immediately adjacent pairs of continuous conductors 62, 63 is removed by a suitable solvent such as carbon tetrachloride, and then the heating wires extending in taut suspended condition across such space between the immediately adjacent pairs of continuous conductors are desirably cemented as by a suitable liquid neoprene cement to the underlying Holland cloth bands, the cement filling the shallow space between the overlying wires and the underlying bands to effect good attachment of the wires to the bands, although for increased clarity such space is shown free of cement in Fig. 11.

Figure 16:
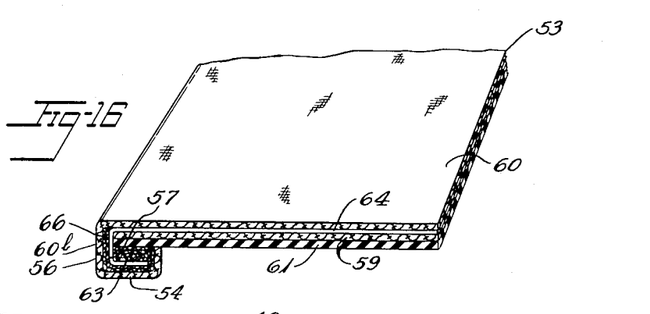
Fig. 16 is a view like Fig. 14 but showing the last step of manufacture of the heating structure, parts being broken away.
Figure 17:
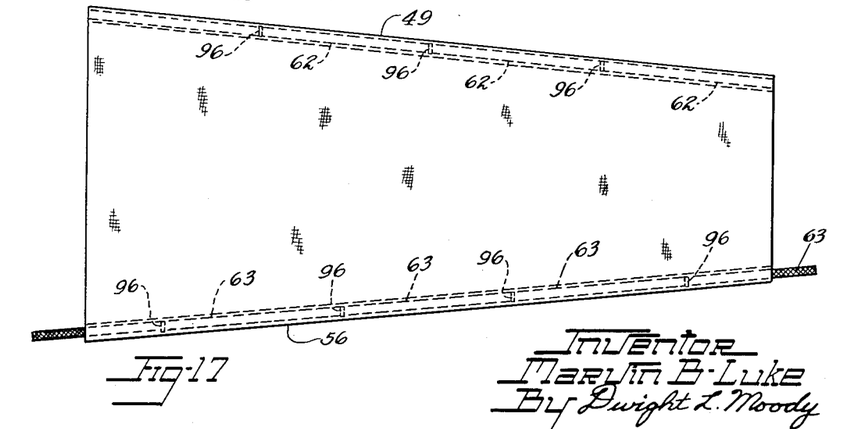
Fig. 17 is a plan view of the completed flat heating structure ready for assembling into the protective covering.

A reinforcing second ply 60 of straight-laid, square-woven glass fabric in strip form coated on both sides with unvulcanized rubbery polychloroprene composition and pre-cut to approximately the tapered shape of the heating structure 46, is then applied and suitably cemented to both the cylindrical reinforcing first ply 59 and the convolutions of heating wire 64 in superimposed relation thereto in each area thereof between adjacent pairs 84 and 85 of the Holland cloth bands with a lateral marginal portion 60a, 60b of the reinforcing second ply extending axially beyond each conductor 62, 63 at each longitudinal margin of said area, the extent of axial overlap of the marginal portions 60a, 60b being sufficient to accommodate folding such marginal portions about the conductors and heating wires in their overlapped bent condition as shown especially in Figs. 3 and 16. The lateral marginal portions 60a, 60b overlying and extending laterally beyond the conductors are not adhered to the conductors and heating wires.

After the respective pre-cut reinforcing second plies 60 are attached adhesively as described hereinabove, all the convolutions of the heating wire 64 and the cylindrical first ply 59 are severed along the longitudinal lines 89, 90 of abutment of each pair of Holland cloth bands 84, 85 so as to provide a plurality of complementary tapered foundational units each having the reinforcing first and second plies 59, 60, a pair of spaced-apart, longitudinally-extending continuous conductors 62, 63, and a plurality of the resistance heating wires 64, 64 extending between and soldered to the pair of conductors. Each of the respective tapered foundational units are assembled in the manner described hereinabove and then all are stripped from the cylindrical supporting surface of the drum 75.

For producing one electrical heating structure of tapered shape, for example, a foundational unit may then be supported on a flat table top, for example, and the free ends of the cut wires which are attached to the underlying Holland cloth bands and project laterally of the conductors, are then trimmed together with the bands 84, 85 and first ply 59 flush with the outer margin of each braided wire conductor of the foundational unit, and the remainders of the bands 84, 85 under the conductors are then removed. The lateral marginal portions 60a, 60b of the reinforcing second ply 60 are next folded outwardly and inwardly and held in the folded condition by several strips 94, 94 of detachable adhesive paper, as shown especially in Figs. 10, 11, 12 and 13. The next step is to sever the marginal portions of the reinforcing first ply 59 immediately underlying the conductors so that the final marginal edges 59a, 59b of the ply 59 are substantially parallel to and spaced $\frac{1}{32}$ inch to $\frac{1}{16}$ inch from the adjacent inner margin of each continuous conductor 62, 63, which spacing represents substantially the thickness of the edge of the first ply 59 and an insulating sheet 61 plus the thickness of a braided conductor. A continuous, thin insulating sheet 61 of resilient all-neoprene material is applied to and throughout the severed reinforcing first ply 59 at the face thereof opposite the heating wires 64, 64, and is adhered to the ply 59 by a suitable liquid neoprene cement, whereby the side margins of the neoprene sheet or layer 61 coincide with the cut-back margins 59a, 59b of the reinforcing first ply 59, as shown especially in Figs. 12 and 13. This completes the steps of making the foundational unit for the heating structure.

Figure 15:
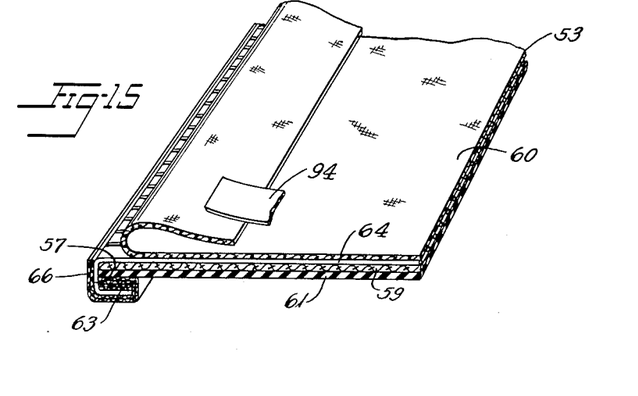
Fig. 15 is a view like Fig. 14 but showing the next succeeding step of manufacture of the heating structure, parts being broken away.

For completing the assembly of the heating structure 46 a thin separator strip 95 of polyethylene material known as Polythene is then applied to the neoprene layer 61 along and spaced at least the width of a conductor, for example, about ¼ in. laterally inward of each side margin thereof so as to provide a well-defined exposed edge for the subsequent attachment thereto of an insulating tape and the inwardly folded conductor and wires, as shown in Figs. 14 and 15. The tackiness of the neoprene layer 61 retains the Polythene strips in place.

A narrow insulating tape 66, 67 made of two, thin plies of suitable woven fabric coated with rubbery polychloroprene composition on both sides and having sufficient width to wind once fully about a conductor, is then applied and adhered by suitable neoprene rubber cement to each said well-defined exposed marginal portion of the layer 61, and extends laterally inward in overlying unattached relation to the adjacent Polythene strip 95. Each tape 66, 67 has its side margin coinciding with the adjacent edges 59a, 59b of the reinforcing first ply 59 and the neoprene insulating layer 61, as shown especially in Fig. 14.

The next step is to sever each of the continuous conductors 62, 63 at spaced-apart positions along the same so that the material of the conductor between immediately adjacent reaches of heating wires 64, 64 is removed and the resulting spaces closed by spacers or fillers 96, 96 of rubbery polychloroprene material equivalent in thickness and width to the conductor. The positions of severance of one continuous conductor are in staggered relation to the positions of severance of the other continuous conductor, whereby the plurality of resistance heating wires 64, 64 are arranged in groups along the tapered foundational unit with the number of wires in each group, desirably equal, such that the individual wires thereof vary only slightly in length and resistance relative to one another despite the convergence of the conductors and are connected in parallel electrically by the conductors and whereby the conductors extend between and connect adjacent groups so as to place them in series electrically. This makes possible effecting substantially uniform heat dissipation for each unit of area of the tapered heating zone throughout a group of the heating wires. It will be noted that the severance of the conductors at the spaced-apart positions along the same produces the desired succession of short flexible conductors along the spaced-apart margins of the heating structure.

The succession of flexible conductors 62, 62 and 63, 63 and their associated heating wires 64, 64 exposed at each of the aforesaid spaced-apart margins of the heating structure, are bent laterally inward so as to position the soldered portions of the wires upper or outermost and seat the flat faces of the conductors directly against the adjacent underlying insulating tape 66 which overlies the insulating sheet 61 and insulating ply 59 covering the adjacent wires 64, 64, as shown especially in Fig. 15, the end portions of the heating wires 64, 64 being bent about what was initially the inner margin of the conductor but which margin, as a result of the bending, is now the outer margin of the conductor in its inwardly bent condition. Next, the narrow two-ply insulating tape 66, 67 at each margin has its free unattached portion folded completely about the conductor and the bent end portions of the heating wires 64, 64 and is attached thereto, as by suitable liquid neoprene cement, in overlying adhered relation to the respective successive conductors and the heating wires, as shown in Fig. 15, to electrically insulate and to mechanically protect the same.

The final steps of making the heating structure 46 are removing the Polythene strips 95, applying suitable liquid neoprene cement to the folded-in marginal portions 60a, 60b of the ply 60, and folding outwardly and then inwardly such marginal portions 60a, 60b about the folded two-ply tape 66, 67, the heating wires 64, 64 and the succession of conductors 62, 62, 63, 63 so as to entirely enclose the same in a protective sheath of the flexible dielectric rubber and fabric material, as shown especially in Fig. 16. The heating structure is then ready for assembly and vulcanization with the other parts of the covering described hereinabove. The heating structure 46 is disposed with the heating wires uppermost for positioning nearest to the outer layer 45 of the covering for facilitating rapidity of transmission of heat to the outer surface of the covering while minimizing heat loss to the underlying structure of the airfoil, and for maintaining effective ice-removal temperatures at such outer surface.

The construction and arrangement of the heating structure 46 or section 46a thereof made in accordance with the method steps described hereinabove produces heating by the resistance wires 64, 64 from edge or margin to edge or margin of the structure; and since the dielectric material enclosing the heating wires and conductors at the margins is relatively thin, there is little or no gap in the heating between adjacent margins of adjacent heating structures in side-by-side adjoining relation. This is important for continuity of heating throughout the heating zones 36, 37, 38 of the covering and for avoiding residual ice along the adjoining margins of adjacent heating zones. The resilient construction of the heating structures and the covering is advantageous for absorbing the impact of stones and for resisting breakage of the heating wires under such impact of stones, while at the same time the particular arrangement of the heating structure and the heating wires minimizes the effect of the breakage of one or more wires upon the heating of the covering as a whole. Also, the hereinabove described construction makes feasible the provision of a trapezoidal shape of the heating structure or covering and its heating grid with attendant independent mounting and smooth fit of the structure or covering as an integral unit on the airfoil such as a wing of gradually decreasing thickness along its leading edge from its inboard end to its outboard end.

Variations may be made without departing from the scope of the invention as it is defined in the following claims.

I claim:

1. An electrically heated protective covering for disposition upon a surface to be protected, said protective covering comprising a sheet-like body of flexible dielectric material including therein an elongate heating zone having spaced-apart margins extending along said zone in converging relation one to the other and in a direction along a margin of the covering so that said zone is of tapered form, and an electrical heating structure united with said body and occupying substantially the entire area of the tapered heating zone, said heating structure comprising a plurality of flexible conductors in succession along each converging margin of said heating zone in insulated relation one to the other, and electrical resistance heating elements extending laterally of said heating zone in spaced-apart substantially parallel insulated relation one to the other and extending from said conductors at one converging margin to said conductors at the other converging margin of said heating zone and connected to said conductors, said heating elements being arranged in groups along the tapered heating zone with the number of elements in each group such that the individual elements thereof vary only slightly in length and resistance relative to one another despite the convergence of said conductors and are connected in parallel electrically by said conductors, and said conductors extending between and connecting adjacent groups of said heating elements so as to place them in series electrically, whereby substantially uniform heat dissipation is effected for each unit of area of said heating zone throughout a group of said heating elements when heating current is passed through the conductors and through the heating elements of the group.

2. An electrically heated protective covering for disposition upon a surface to be protected, said protective covering comprising a sheet-like body of elastic dielectric material including therein an elongate heating zone extending along said body with spaced-apart longitudinal margins of said zone in converging relation one to the other so that the zone is of tapered form, and an electrical heating structure united with said body and occupying substantially the entire area of the tapered heating zone, said heating structure comprising a plurality of flexible conductors in succession along each longitudinal converging margin of said heating zone in insulated relation one to the other, and electrical resistance heating wires extending laterally of said heating zone in spaced-apart substantially parallel insulated relation one to the other and extending from said conductors at one converging margin to said conductors at the other converging margin of said heating zone and connected to said conductors, said heating wires being arranged in groups longitudinally of said tapered heating zone with an equal number of wires in each group such that the individual wires of the group vary only slightly in length and resistance relative to one another despite the convergence of said conductors and are connected in parallel electrically by said conductors, and said conductors extending between and connecting adjacent groups of said heating wires so as to place them in series electrically, whereby substantially uniform and equal heat dissipation is effected for each unit of area of said tapered heating zone throughout all of said groups of heating wires when heating current is passed through said conductors and through said heating wires of the groups.

3. Apparatus for preventing the accumulation of ice upon the leading edge of a wing for other airfoil of an aircraft, said apparatus comprising a protective covering of flexible dielectric material for mounting conformingly upon said leading edge, and an electrical heating structure of tapered form in plan constituting a unitary part of the covering and extending spanwise thereof to provide a tapered heating zone therein with chordwise spaced-apart spanwise-extending margins of said zone in converging relation one to the other, said heating structure comprising a plurality of flexible conductors in succession along each converging margin of said tapered heating zone and imbedded in said dielectric material of the covering in insulated relation one to the other, and electrical resistance heating wires imbedded in said dielectric material of the covering and extending chordwise of said heating zone in closely spaced-apart substantially parallel insulated relation one to the other and extending from said conductors at one converging margin to said conductors at the other converging margin of said heating zone and connected to said conductors, said heating wires being arranged in groups spanwise of said heating zone with the number of wires in each group such that the individual wires thereof vary only slightly in length and resistance relative to one another despite the convergence of said conductors and are connected in parallel electrically by said conductors, and said conductors extending spanwise between and connecting adjacent groups of said heating wires so as to place them in series electrically, whereby substantially uniform heat dissipation is effected for each unit of area of said heating zone throughout a group of said heating wires when heating current is passed through the conductors and through the heating wires of the group.

4. Apparatus for preventing the accumulation of ice upon the leading edge of a wing or other airfoil of an aircraft, said apparatus comprising an elongate protective covering of flexible dielectric material and tapered form in plan for mounting conformingly upon said leading edge and having therein a pair of elongate heating zones of tapered form in plan extending spanwise thereof in side-by-side relation one to the other with the narrowest ends of both zones nearest the narrowest end of said covering, each tapered heating zone having chordwise spaced-apart spanwise-extending margins in gradually converging relation one to the other, and individual heating structures of tapered form in plan constituting a unitary part of said covering with one of the structures occupying substantially the entire area of one heating zone and the other structure occupying substantially the entire area of the other heating zone, each heating structure comprising a plurality of flexible conductors in succession along each converging margin of a heating zone and imbedded in said dielectric material of the covering in insulated relation one to the other, and electrical resistance heating wires imbedded in said dielectric material of the covering and extending chordwise of the last said heating zone in closely spaced-apart substantially parallel insulated relation one to the other and extending chordwise from said conductors at one converging margin to said conductors at the other converging margin of the last said heating zone and connected to said conductors, said heating wires being arranged in groups spanwise of the heating zone with the number of wires in each group being equal and such that the individual wires thereof vary only slightly in length and resistance relative to one another despite the convergence of said conductors and are connected in parallel electrically by said conductors, and said conductors extending spanwise between and connecting adjacent groups of said heating wires so as to place them in series electrically, whereby substantially uniform and equal heat dissipation is effected for each unit of area of the last said heating zone throughout all the groups of heating wires when heating current is passed through the conductors and through the heating wires of all the groups.

5. Apparatus for preventing the accumulation of ice upon the leading edge of an aircraft wing or other airfoil, said apparatus comprising an elongate protective covering of flexible dielectric material for mounting conformingly upon said leading edge, and electrical heating means constituting a unitary part of said covering to provide therein a plurality of elongate heating zones extending spanwise thereof in side-by-side adjoining relation one to the other, said heating means comprising an individual electrical heating structure extending spanwise of the covering in each heating zone with adjacent spanwise margins of adjacent heating structures in substantially adjoining electrically insulated relation one to the other for effecting continuity of heating chordwise across all said heating structures and also across the adjacent spanwise margins thereof, each heating structure comprising a thin sheet-like body of flexible dielectric material having closed fold portions extending spanwise along chordwise spaced-apart margins of said structure to provide conductor passages in said margins having continuous peripheral walls of said flexible dielectric material of said body, flexible conductors in succession within each conductor passage in insulated relation one to the other and secured to the wall of the passage, and flexible resistance heating elements in said body extending chordwise of said structure in spaced-apart substantially parallel insulated relation one to the other with spaced portions of the heating elements crossing said conductors at a face thereof in overlapping insulated relation thereto and the continuing peripherally about said fold portions and said conductors to a position overlying said conductors at the other face thereof and overlying said spaced portions of the heating elements and being secured in overlapping contacting relation to said conductors at said positions thereon so as to effect heating of said structure continuously from spanwise margin to spanwise margin thereof upon passage of heating current through said conductors and through said heating elements, said resistance heating elements being arranged in groups spanwise the individual elements of which are connected in parallel electrically by said conductors, and said conductors extending between and connecting adjacent groups so as to place them in series electrically.

6. Apparatus for preventing the accumulation of ice on the leading edge of an aircraft wing and the like, said apparatus comprising an elongate protective covering of elastic dielectric material and tapered form in plan for mounting conformingly upon said leading edge and having an elongate heating zone of tapered form in plan extending spanwise of the covering, and an electrical heating structure extending spanwise of the covering and occupying substantially the entire area of the tapered heating zone and constituting a unitary part of the covering, said heating structure comprising a thin elongate sheet-like body of elastic dielectric material and tapered form in plan having closed fold portions including insulating tapes therein extending spanwise of the structure in gradually converging relation one to the other at chordwise spaced-apart margins of the structure to provide conductor passages in said margins having continuous peripheral walls of said tapes and said dielectric material of said body, flexible flat stranded conductors in succession spanwise within each conductor passage in insulated relation one to the other and secured to the wall of the passage, and flexible resistance heating wires in said body extending chordwise of said structure in spaced-apart substantially parallel insulated relation one to the other with spaced portions of the heating wires crossing said conductors at a face thereof in overlapping insulated relation thereto and then continuing peripherally about said fold portions and said conductors to a position overlying said conductors at the other face thereof and overlying said spaced portions of the heating wires and being secured to said conductors at said positions thereon so as to effect heating of said structure continuously from spanwise margin to spanwise margin thereof upon passage of heating current through said conductors and through said heating wires, said resistance heating wires being arranged in groups spanwise along the tapered heating zone with the number of wires in each group such that the individual wires of the group vary only slightly in length and resistance relative to one another despite the tapered disposition of the conductors and are connected in parallel electrically by said conductors, and said conductors extending between and connecting adjacent spanwise groups so as to place them in series electrically, whereby substantially uniform heat dissipation is effected for each unit of area of said heating zone throughout a group of said heating wires and from spanwise margin to spanwise margin of the heating structure when heating current is passed through the conductors and the heating wires of the group.

7. Apparatus for preventing the accumulation of ice on the leading edge of an aircraft wing and the like, said apparatus comprising an elongate protective covering of elastic dielectric material and tapered form in plan for mounting conformingly upon said leading edge and having a plurality of elongate heating zones extending spanwise of the covering in side-by-side adjoining relation one to the other to provide a frontal heating zone of rectangular form in plan for the frontal region of the leading edge and to provide rearward heating zones of tapered form in plan for the rearward regions of the leading edge, and an electrical heating structure in each heating zone extending spanwise of the covering and occupying substantially the entire area of the heating zone and constituting a unitary part of the covering, each heating structure comprising a thin elongate sheet-like body of rubbery polychloroprene dielectric material and of a form in plan corresponding to that of the heating zone occupied by such heating structure and having closed fold portions including insulating tapes therein extending spanwise of the structure at chordwise spaced-apart margins of the structure to provide conductor passages in said margins having continuous peripheral walls of said tapes and said rubbery polychloroprene dielectric material, flexible flat stranded conductors in succession spanwise within each conductor passage in insulated relation one to the other and secured to the wall of the passage, and flexible resistance heating wires in said body extending chordwise of said structure in spaced-apart substantially parallel insulated relation one to the other with spaced portions of the heating wires crossing said conductors at a face thereof in overlapping insulated relation thereto and then continuing peripherally about said fold portions and said conductors to a position overlying said conductors at the other face thereof and overlying said spaced portions of the heating wires and being secured to said conductors at said positions thereon so as to effect heating of said structure continuously from spanwise margin to spanwise margin thereof upon passage of heating current through said conductors and through said heating wires, said resistance heating wires being arranged in groups spanwise the individual wires of which are connected in parallel electrically by said conductors, and said conductors extending between and connecting adjacent spanwise groups so as to place them in series electrically.

8. An electrical heating structure for a protective covering and comprising a tapered elongated sheet-like body of flexible dielectric material having spaced-apart margins extending along said body in converging relation one to the other, a plurality of flexible conductors in succession extending along each of the converging margins in insulated relation to one another with the conductors at one margin in staggered relation to the conductors at the other margin, and individual electrical resistance heating elements extending laterally of said body in spaced-apart substantially parallel insulated relation one to the other and extending entirely in said insulated relation from said conductors at one converging margin to said conductors at the other converging margin of said body and each individually connected to said conductors, said heating elements being arranged in groups along the body with the number of elements in each group such that the individual elements thereof vary only slightly length and resistance relative to one other despite the convergence of said conductors and are connected in parallel electrically by said conductors, and said conductors extending between and connecting adjacent groups of said heating elements so as to place them in series electrically, whereby substantially uniform heat dissipation is effected for each unit of area of said body throughout a group of said heating elements when heating current is passed through the conductors and the heating elements of the group.

9. An electrical heating structure for a protective covering an comprising an elongate sheet-like body of elastic dielectric material having spaced-apart margins extending longitudinally of the body in gradually converging relation one to the other, a plurality of flexible conductors imbedded in said body and disposed in succession along each of the converging margins in insulated relation to one another with the conductors at one margin in staggered relation to the conductors at the other margin, and electrical resistance heating wires imbedded in said body and extending laterally of said body in spaced-apart substantially parallel insulated relation one to the other and extending from said conductors at one converging margin to said conductors at the other converging margin of said body and connected to said conductors, said heating wires being arranged in groups along the body with the number of wires in each group equal and such that the individual wires of the group vary only slightly in length and resistance relative to one another despite the convergence of the conductors and are connected in parallel electrically by said conductors, and said conductors extending between and connecting adjacent groups of said heating wires so as to place them in series electrically, whereby substantially uniform and equal heat dissipation is effected for each unit of area of the body throughout all said groups of heating wires when heating current is passed through said conductors and through said heating wires of the groups.

10. An electrical heating structure comprising a thin elongate sheet-like body of flexible dielectric material having laterally spaced-apart hollow marginal portions extending longitudinally of the body to provide conductor passages in longitudinal margins of said structure, a plurality of flexible conductors in succession within each of said passages secured to the wall of said marginal portions, and a plurality of spaced-apart substantially parallel individual flexible heating elements extending laterally of said body between and entirely across said conductors in overlying spaced insulated relation to a face thereof and in fully insulated relation one to the other with end portions of said heating elements continuing in a folded manner peripherally about said marginal portions and partially about said conductors in spaced insulated relation to the latter and secured mechanically and electrically to said conductors at the opposite faces thereof, said dielectric material being in the spaces between the first said faces of said conductors and the adjacent overlying portions of said heating elements crossing said conductors and being superimposed on said end portions of said heating elements to cover and electrically insulate the end portions at said margins, said heating elements being arranged in groups longitudinally of the structure with the individual heating elements of a group being connected in parallel electrically, and said conductors extending between and connecting adjacent groups so as to place them in series electrically.

11. An electrical heating structure as defined in claim 10 in which said thin elongate sheet-like body is of elastic rubber-like material having electrical insulating and heat-resisting characteristics, and said heating elements between said margins and at said conductors of the structure are resistance wires imbedded in the elastic material beneath the outer surface of said body to provide said elastic material underlying and overlying said heating elements, and in which said body has a textile fabric sheet reinforcement in the underlying elastic material and a second textile fabric sheet reinforcement in the overlying elastic material, one of said reinforcements continuing in the elastic material which is superimposed on said end portions of said heating elements so as to enclose the same and also said conductors in a protective sheath of elastic material and fabric reinforcement.

12. An electrical heating structure comprising a thin elongate sheet-like body of flexible dielectric material having laterally spaced-apart marginal portions of said material with reinforcing insulating tapes therein extending longitudinally of the body and arranged in a closed folded disposition at a face of said body to provide conductor passages in longitudinal margins of said structure having continuous peripheral walls of said dielectric material and said tapes, flexible conductors within said passages secured to said walls thereof, and a plurality of flexible heating elements of filamentary resistance metal material extending laterally of said body from one longitudinal margin to the other longitudinal margin of the structure in spaced-apart substantially parallel insulated relation one to the other with end portions of the heating elements crossing said conductors in overlying insulated relation to said conductors and said tapes and then continuing about the folded marginal portions and tapes and about the conductors to a position overlying said conductors and being secured mechanically in overlapping contacting relation to said conductors at said positions thereon, said heating elements being imbedded in said dielectric material beneath the outer surface of said body between said margins and about said conductor passages.

13. An electrical heating structure comprising an elongate sheet-like body of elastic dielectric material and tapered form in plan having spaced-apart closed fold portions extending along the body in converging relation one to the other at laterally spaced-apart margins of the structure to provide conductor passages in said margins having continuous peripheral walls of said dielectric material, flexible stranded conductors in flat strip form arranged in succession in each converging conductor passage in insulated relation one to the other and secured to the wall of the passage, and flexible resistance heating wires extending laterally of said body from one converging margin to the other converging margin of the structure and extending in closely spaced-apart substantially parallel insulated relation one to the other with end portions thereof crossing said conductors in overlying insulated relation to a flat face thereof and then continuing about said fold portions and about said conductors to a position overlying the opposite flat face of said conductors and having a fused metal connection to said conductors entirely across said opposite flat faces thereof, said resistance heating wires being arranged in groups along the structure with the number of wires in each group such that the individual wires thereof vary only slightly in length and resistance relative to one another despite the convergence of said conductors and are connected in parallel electrically by said conductors, and said conductors extending between and connecting adjacent groups so as to place them in series electrically, whereby substantially uniform heat dissipation is effected for each unit of area of the structure throughout a group of said heating wires when heating current is passed through the conductors and the heating wires of the group.

14. An electrical heating structure of tapered form in plan comprising a pair of tapered superimposed plies of woven textile fabric sheet material each having on both sides thereof a thin coating of rubbery polychloroprene dielectric material, one of said plies being of lesser width than the other ply and terminating in marginal edges at spaced-apart converging margins of the tapered structure, an additional thin layer of rubbery polychloroprene dielectric material overlying the first said ply and coextensive therewith, said other ply having marginal portions extending inwardly in a folded manner about said marginal edges of the first said ply and disposed in overlapping contacting relation to said layer at a face of the structure so as to provide with said first said ply and said layer conductor passages in said converging margins having closed peripheral walls, flexible stranded conductors of flat strip form in succession within each conductor passage in insulated relation one to the other and disposed in face-to-face relation upon said layer, electrical resistance heating wires disposed between said plies and extending across the structure in closely spaced-apart substantially parallel insulated relation one to the other with end portions of the heating wires crossing said conductors and continuing beneath said other ply in a folded manner about the marginal edges of said first said ply and of said layer and about said conductors in insulated relation thereto to a position thereon at a face thereof remote from said layer and being secured to said conductors in overlapping contacting relation to said face thereof, and thin flexible insulating tapes in a wrapped disposition about said conductors and about said end portions of the heating wires and arranged between said other ply and said end portions of the wires and also between said conductors and said layer, said resistance heating wires being arranged in groups with the number of wires in each group such that the individual wires thereof vary only slightly in length and resistance relative to one another despite the tapered disposition of said conductors and are connected in parallel electrically by said conductors, and said conductors extending between and connecting adjacent groups so as to place them in series electrically, whereby substantially uniform heat dissipation is effected for each unit of area of the structure throughout a group of said heating wires when heating current is passed through the conductors and the heating wires of the group.

15. Apparatus for preventing the accumulation of ice upon the leading edge of an aircraft wing or other airfoil, said apparatus comprising an elongated protective covering of flexible dielectric material for mounting conformingly upon and spanwise along said leading edge, and electrical heating means constituting a unitary part of said covering to provide therein a heating zone, said means comprising an elongated heating structure extending lengthwise in said covering along said heating zone thereof for disposition spanwise along said leading edge and said heating structure including a thin sheet-like body of flexible dielectric material having conductor passages therein extending lengthwise of the covering at and along chordwise spaced-apart spanwise-extending margins of said heating structure, a plurality of flexible conductors extending spanwise in succession within each conductor passage in insulated relation one to the other and secured to the wall of the passage, and individual flexible resistance heating elements in said body extending chordwise of said heating structure in spaced-apart substantially parallel insulated relation one to the other throughout their length between said conductors with spaced portions of the heating elements crossing said conductors at a face thereof in overlapping spaced insulated relation thereto and then continuing peripherally partially about said conductors in spaced relationship and insulated from each other to a position on said conductors at the other face thereof and secured in overlapping contacting relation to said conductors at said positions thereon so as to effect heating of said heating structure continuously from spanwise margin to spanwise margin thereof upon passage of heating current through the conductors and the heating elements, said resistance heating elements being arranged in groups spanwise the individual elements of which are connected in parallel electrically by said conductors, and said conductors extending between and connecting adjacent groups so as to place them in series electrically.

16. Apparatus for preventing the accumuation of ice upon the leading edge of an aircraft wing or other airfoil, said apparatus comprising an elongated protective covering of flexible dielectric material mounting conformingly about and along said leading edge, and electrical heating means constituting a unitary part of said covering to provide therein a heating zone, said means comprising an elongated electrical heating structure extending lengthwise in said covering along said heating zone thereof and said heating structure including a thin sheet-like body of flexible dielectric material having conductor passages therein extending lengthwise of the covering at and along transversely spaced-apart lengthwise-extending margins of said heating structure, flexible conductor means extending lengthwise within each conductor passage and secured to the wall of the passage, and individual flexible resistance heating elements in said body extending transversely of said heating structure in spaced-apart substantially parallel insulated relation one to the other throughout their length between said conductor means with spaced portions of the heating elements crossing said conductor means at a face thereof in overlapping spaced insulated relation thereto and then continuing peripherally partially about said conductor means in spaced relationship and insulated from each other to a position on said conductor means at the other face thereof and secured in overlapping contacting relation to said conductor means at said positions thereon so as to effect heating of said heating structure continuously from lengthwise margin to lengthwise margin thereof upon passage of heating current through the conductor means and the heating elements.

References Cited in the file of this patent

UNITED STATES PATENTS

| | | |
|---|---|---|
| 2,061,516 | Frese | Nov. 17, 1936 |
| 2,107,067 | Alderfer | Feb. 1, 1938 |
| 2,157,050 | Bilger et al. | May 2, 1939 |
| 2,423,196 | MacKendrick | July 1, 1947 |
| 2,454,874 | Hunter | Nov. 30, 1948 |
| 2,503,457 | Speir et al. | Apr. 11, 1950 |
| 2,564,325 | Coonly | Aug. 14, 1951 |
| 2,575,987 | York et al. | Nov. 20, 1951 |
| 2,599,059 | Jones | June 3, 1952 |
| 2,619,580 | Pontiere | Nov. 25, 1952 |
| 2,643,320 | Pfenninger | June 23, 1953 |